US006476119B1

(12) United States Patent
Kucera et al.

(10) Patent No.: US 6,476,119 B1
(45) Date of Patent: Nov. 5, 2002

(54) AQUEOUS PRIMER OR COATING

(75) Inventors: Helmut W. Kucera, West Springfield, PA (US); Rebecca S. Cowles, Wattsburg, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/235,778

(22) Filed: Jan. 22, 1999

Related U.S. Application Data

(60) Provisional application No. 60/072,779, filed on Jan. 27, 1998.

(51) Int. Cl.$^7$ ............................... C08J 3/00; C08L 81/00; C08K 3/20
(52) U.S. Cl. ..................... 524/541; 524/591; 524/594; 524/595; 524/596; 524/841; 427/372.2; 427/385.5; 427/388.1; 427/388.2; 427/388.3; 427/388.4; 428/460
(58) Field of Search .................. 524/591, 594, 524/595, 596, 541, 841; 427/372.2, 385.5, 388.1, 388.2, 388.3, 388.4; 428/460

(56) References Cited

U.S. PATENT DOCUMENTS

| | | | |
|---|---|---|---|
| 4,111,880 A | 9/1978 | Abendroth et al. | 260/29.6 |
| 4,167,500 A | 9/1979 | Jazenski et al. | 260/29.3 |
| 4,376,000 A | 3/1983 | Lindert | 148/615 |
| 4,414,350 A | 11/1983 | Hall | 524/320 |
| 4,433,015 A | 2/1984 | Lindert | 148/615 R |
| 4,457,790 A | 7/1984 | Lindert et al. | 148/615 |
| 4,792,355 A | 12/1988 | Siegl et al. | 106/14.15 |
| 4,994,521 A | 2/1991 | Broadbent | 524/575 |
| 5,011,551 A | 4/1991 | Emeric et al. | 148/248 |
| 5,017,683 A | 5/1991 | Otani et al. | 528/396 |
| 5,061,523 A | 10/1991 | Shachat | 427/377 |
| 5,162,156 A | 11/1992 | Troughton, Jr. et al. | 428/460 |
| 5,200,455 A | 4/1993 | Warren | 524/413 |
| 5,385,655 A | 1/1995 | Brent et al. | 204/181.1 |
| 5,385,979 A | 1/1995 | Ozawa et al. | 525/145 |
| 5,427,632 A | 6/1995 | Dolan | 148/259 |
| 5,427,863 A | 6/1995 | Siebert | 428/463 |
| 5,486,414 A | 1/1996 | Roberto et al. | 428/334 |
| 5,500,460 A | 3/1996 | Ahmed et al. | 523/402 |
| 5,508,141 A | 4/1996 | Hart et al. | 430/191 |
| 5,691,048 A | 11/1997 | Roberto et al. | 428/334 |
| 5,711,996 A | 1/1998 | Claffey | 428/388.4 |
| 5,868,820 A | 2/1999 | Claffey | 106/14.44 |

FOREIGN PATENT DOCUMENTS

| | | |
|---|---|---|
| DE | 197 55 421 | 6/1999 |
| GB | 1 469 993 | 4/1977 |
| JP | 60 149652 A | 12/1985 |
| WO | 0 319 018 B1 | 12/1988 |
| WO | WO 93/15154 | 8/1993 |
| WO | WO 95/23038 | 8/1995 |
| WO | WO 97/09127 | 3/1997 |

OTHER PUBLICATIONS

Thomas, Andrew. "Autopheric coatings chemicals: A new technology to Europe". *Finishing*, Oct. 1996, pp. 28–30.

*Primary Examiner*—Peter D. Mulcahy
(74) *Attorney, Agent, or Firm*—Miles B. Dearth

(57) ABSTRACT

A primer or coating composition that includes (A) an aqueous dispersion of a phenolic resin that includes water and a reaction product of a phenolic resin precursor, a modifying agent and, optionally, a multi-hydroxy phenolic compound wherein the modifying agent includes at least one functional moiety that enables the modifying agent to react with the phenolic resin precursor and at least one ionic moiety, and (B) a flexibilizer. According to one embodiment the modifying agent is an aromatic compound. According to another embodiment the ionic moiety of the modifying agent is sulfate, sulfonate, sulfinate, sulfenate or oxysulfonate and the dispersed phenolic resin reaction product has a carbon/sulfur atom ratio of 20:1 to 200:1.

57 Claims, No Drawings

AQUEOUS PRIMER OR COATING

This application claims benefit of U.S. Provisional Application No. 60/072,779, filed Jan. 27, 1998.

BACKGROUND OF THE INVENTION

The present invention relates to an aqueous primer or coating, particularly a primer for use in polymeric material-to-metal adhesive bonding and a coating for protecting metallic surfaces.

Primers are often used as an undercoat in combination with a covercoat adhesive in order to achieve superior bonding between two substrates made from different materials. One particular application for such primers is in bonding metal surfaces to elastomeric surfaces. Elastomer-to-metal bonding is subjected to severe environmental conditions in many industrial and automotive assemblies. For example, many engine mounting assemblies that employ elastomer-to-metal bonding contain fluids in order to assist in damping of vibration of the engine. These fluid-filled engine mounting devices are being exposed to increasingly high temperatures such that the elastomer-to-metal adhesive bonds within the mounts are being exposed to very high temperature fluid environments. Many elastomer-to-metal assemblies, particularly those utilized in automobile applications, are routinely exposed to materials that contain corrosive salts or other corrosive materials that may act to degrade the elastomer-to-metal adhesive bond.

In light of the increasing regulations regarding volatile organic compounds (VOC), the use of traditional solvent-borne adhesives is becoming more problematic. Consequently, there is significant ongoing work to develop water-borne replacements. For example, U.S. Pat. No. 4,167,500 describes an aqueous adhesive composition that includes a water-dispersible novolak resin, a methylene donor and water. Aqueous or water-borne primers are known and described in U.S. Pat. Nos. 5,200,455 and 5,162,156, but they have various shortcomings compared to solvent-borne primers. For example, it is desirable to improve the environmental resistance performance of aqueous elastomer-to-metal adhesion primers that include polyvinyl alcohol-stabilized phenolic resin dispersions (see U.S. Pat. No. 5,200,455) when used with certain important adhesive covercoats. Elastomer-to-metal primers that include phenolic resins derived from water soluble phenolic precursors are also known (see U.S. Pat. No. 5,162,156) but these suffer from drawbacks that prevent their use to form robust, environmentally resistant films. Before being thermoset, films formed from water soluble phenolic resins tend to re-solvate when exposed to water. The source of the water can be an aqueous covercoat applied to the film. Application of the aqueous covercoat essentially washes away the film formed from the water soluble phenolic resin. In addition, such films exhibit very limited resistance to corrosive fluids.

Another problem associated with the bonding of elastomer to metal relates to pre-heating or pre-baking of the dried adhesive prior to bonding. The metal substrate typically is coated with the adhesive, the adhesive is dried and then the adhesive-coated metal substrate is placed in a mold. Elastomer then is introduced into the mold and bonded to the metal substrate during vulcanization of the elastomer. The bonded part is removed from the mold and the next metal substrate is placed in the mold. When this subsequent metal substrate is placed in the mold it is subjected to the heat retained in the mold from the previous molding operation. The dried adhesive must be able to withstand this retained heat (referred to herein as "pre-heating") prior to bonding.

Consequently, there exists a continuing need for an aqueous primer that provides robust adhesive bonding in hot, corrosive environments, has an affinity for a broad range of covercoats, and forms a flexible film that is resistant to pre-heating conditions and exhibits superior shelf-life stability and resistance to resolvation. It would be especially advantageous if such a primer could also be used as a coating for protecting a metallic surface.

At present, there are two commonly-used metal coating methods electrodeposition and autodeposition—that are typically used subsequent to, or as a substitute for, phosphatizing of the metallic surface. Electrodeposition (frequently referred to as "E-coat") involves immersing a metal surface in a composition then applying a voltage through the composition so that a coating will deposit on the metal surface. An autodeposition coating is commercially available from Henkel and its subsidiary Parker Amchem under the trademark AUTOPHORETIC®.

According to the patents and commercial literature, immersion of a metallic surface in an autodeposition composition produces what is said to be a self-limiting protective coating on a metal substrate. Autodeposition compositions are known to generally include water, resin solids dispersed in the aqueous medium, and an activator. For example, the aqueous autodeposition solution in one commercial embodiment contains 3–5 percent solids of a latex (polyvinylidene chloride or acrylic) and carbon black, ferric fluoride and a low concentration of hydrofluoric acid to provide a solution pH of 2.5–3.0. According to the commercialized multi-stage process, a clean degreased steel panel is immersed in an autodeposition solution for one to two minutes, the resulting "green" film is rinsed in a reaction rinse solution and then dried at 100° C. The reactive rinse solution can include a diphosphonic acid.

The dispersed resin solid typically is derived from ethylenically unsaturated monomers. Polyvinylidene chloride is the preferred resin. Polyethylene, polyacrylic, styrene-butadiene and epoxy resins are mentioned as possible resin particles that are dispersed or emulsified in water (see U.S. Pat. Nos. 4,414,350; 4,994,521; 5,427,863; 5,061,523; and 5,500,460). According to U.S. Pat. No. 5,486,414, AUTOPHORETIC® 800 Series compositions are based on polyvinylidene chloride and AUTOPHORETIC® 700 Series compositions are based on acrylic resins.

The activator is an ingredient or ingredients that convert the composition into one which will form a self-limiting resinous coating on a metallic surface. The activating system generally comprises an acidic oxidizing system, for example: hydrogen peroxide and HF; $HNO_3$; a ferric-containing compound and HF; and other soluble metal-containing compounds, for example, silver fluoride, ferrous oxide, cupric sulfate, cobaltous nitrate, silver acetate, ferrous phosphate, chromium fluoride, cadmium flouride, stannous flouride, lead dioxide, and silver nitrate in an amount of 0.025 to 50 g/l and an acid, which can be used alone or in combination with hydrofluoric acid, and including, for example, sulfuric, hydrochloric, nitric and phosphoric acid, and organic acids, including, for example, acetic, chloroacetic and trichloroacetic acids.

In the case of treating zinciferous surfaces (e.g., galvanized steel), PCT International Patent Application Publication No. WO 97/09127 discloses treating the surface prior to autodeposition with a composition consisting of water, dissolved phosphonate (for example, diethylene triaminepenta (methylene phosphonic acid) or aminotri(methylene phosphonic acid)), aromatic sulfonate surfactant (for example, disulfonated derivative of dodecyl ether (DOWFAX 2A1 or 2A0)), and dissolved non-oxidizing acid (for example, hydrochloric acid).

Autodeposition coatings are recognized as being very distinct from coatings formed by immersing metallic surfaces in compositions simply comprising solid resin particles dispersed in water (in other words, conventional latices) and coatings formed from acidic aqueous coating compositions that contain dispersed solid resin particles and relatively high amounts of water soluble corrosion inhibitors such as hexavalent chromium compounds (see U.S. Pat. No. 4,242,379). In both instances, the thickness of the resulting coating is not determined by the amount of time in which the metallic surface is immersed in the composition.

SUMMARY OF THE INVENTION

According to the present invention there is provided a composition useful as a primer or a coating that includes (A) an aqueous dispersion of a phenolic resin that includes water and a reaction product of a phenolic resin precursor, a modifying agent and, optionally, a multi-hydroxy phenolic compound wherein the modifying agent includes at least one functional moiety that enables the modifying agent to react with the phenolic resin precursor and at least one ionic moiety, and (B) a flexibilizer. According to one embodiment the modifying agent is an aromatic compound. According to another embodiment the ionic moiety of the modifying agent is sulfate, sulfonate, sulfinate, sulfenate or oxysulfonate and the dispersed phenolic resin reaction product has a carbon/sulfur atom ratio of 20:1 to 200:1.

One preferred embodiment of the composition is particularly useful as a primer for bonding a metallic surface to a polymeric surface and includes a novolak version of the phenolic resin dispersion (A), the flexibilizer (B), and (C) an aldehyde, preferably formaldehyde, donor compound. According to another preferred embodiment the composition is a coating for a metallic surface that includes a resole version of the phenolic resin dispersion (A) and the flexibilizer (B).

When applied to a substrate surface, particularly a metal surface, and thermoset the composition forms a flexible film that protects the surface from high temperatures, corrosive conditions and chemical attack or degradation. In addition, when used as a primer in combination with an adhesive covercoat, the primer has improved adhesion to a broad range of covercoats and exhibits superior resistance to resolvation and chemically aggressive environments. The aqueous composition also has more than adequate shelf-life stability.

A unique advantage of the composition of the invention is that it is autodepositable when applied to an electrochemically active metallic surface. Autodeposition enables the composition to form a self-limiting, substantially uniform film.

There is also provided according to the invention a method for protectively coating a metallic substrate surface that includes (I) initially applying to the metallic substrate surface a metal treatment composition that contains (A) an aqueous dispersion of a phenolic novolak resin that includes water and a reaction product of a phenolic resin precursor, a modifying agent and a multi-hydroxy phenolic compound wherein the modifying agent includes at least one functional moiety that enables the modifying agent to react with the phenolic resin precursor and at least one ionic moiety, (B) an acid and, optionally, (C) a flexibilizer and then (II) applying to the treated metallic substrate surface the primer or coating composition described above.

DETAILED DESCRIPTION OF THE PREFERRED EMBODIMENTS

Unless otherwise indicated, description of components in chemical nomenclature refers to the components at the time of addition to any combination specified in the description, but does not necessarily preclude chemical interactions among the components of a mixture once mixed.

Certain terms used in this document are defined below.

"Primer" means a liquid composition applied to a surface as an undercoat beneath a subsequently-applied covercoat. The covercoat can be an adhesive and the primer/adhesive covercoat forms an adhesive system for bonding two substrates together.

"Coating" means a liquid composition applied to a surface to form a protective and/or aesthetically pleasing coating on the surface.

"Phenolic compound" means a compound that includes at least one hydroxy functional group attached to a carbon atom of an aromatic ring. Illustrative phenolic compounds include unsubstituted phenol per se, substituted phenols such as alkylated phenols and multi-hydroxy phenols, and hydroxy-substituted multi-ring aromatics. Illustrative alkylated phenols include methylphenol (also known as cresol), dimethylphenol (also known as xylenol), 2-ethylphenol, pentylphenol and tert-butyl phenol. "Multi-hydroxy phenolic compound" means a compound that includes more than one hydroxy group on each aromatic ring. Illustrative multi-hydroxy phenols include 1,3-benzenediol (also known as resorcinol), 1,2-benzenediol (also known as pyrocatechol), 1,4-benzenediol (also known as hydroquinone), 1,2,3-benzenetriol (also known as pyrogallol), 1,3,5-benzenetriol and 4-tert-butyl-1,2-benzenediol (also known as tert-butyl catechol). Illustrative hydroxy-substituted multi-ring aromatics include 4,4'-isopropylidenebisphenol (also known as bisphenol A), 4,4'methylidenebisphenol (also known as bisphenol F) and naphthol.

"Aldehyde compound" means a compound having the generic formula RCHO. Illustrative aldehyde compounds include formaldehyde, acetaldehyde, propionaldehyde, n-butylaldehyde, n-valeraldehyde, caproaldehyde, heptaldehyde and other straight-chain aldehydes having up to 8 carbon atoms, as well as compounds that decompose to formaldehyde such as paraformaldehyde, trioxane, furfural, hexamethylenetriamine, acetals that liberate formaldehyde on heating, and benzaldehyde.

"Phenolic resin" generally means the reaction product of a phenolic compound with an aldehyde compound. The molar ratio of the aldehyde compound (for example, formaldehyde) reacted with the phenolic compound is referred to herein as the "F/P ratio". The F/P ratio is calculated on a per hydroxy-substituted aromatic ring basis.

"Phenolic resin precursor" means an unmodified or conventional phenolic resin that is reacted with the aromatic modifying agent to produce the phenolic resin that is dispersed in an aqueous phase.

"Electrochemically active metals" means iron and all metals and alloys more active than hydrogen in the electromotive series. Examples of electrochemically active metal surfaces include zinc, iron, aluminum and cold-rolled, polished, pickled, hot-rolled and galvanized steel.

"Ferrous" means iron and alloys of iron.

The phenolic resin dispersion (A) of the inventive composition can be obtained by reacting or mixing a phenolic resin precursor and a modifying agent—theoretically via a condensation reaction between the phenolic resin precursor and the modifying agent.

One functional moiety provides the ionic pendant group that enables stable dispersion of the phenolic resin. Without the ionic pendant group, the phenolic resin would be unable to maintain a stable dispersion in water. Since the ionic pendant group provides for the stability of the dispersion there is no need, or at the most a minimal need, for surfactants. The presence of surfactants in an aqueous composition is a well-known hindrance to the composition's performance.

The other important functional moiety in the modifying agent enables the modifying agent to react with the phenolic resin precursor. The modifying agent can contain more than one ionic pendant group and more than one reaction-enabling moiety.

Incorporation of aromatic sulfonate functional moieties into the phenolic resin structure via condensation is the preferred method of providing the ionic pendant groups. Accordingly, one class of ionic moieties are substituents on an aromatic ring that include a sulfur atom covalently or ionically bonded to a carbon atom of the aromatic ring. Examples of covalently bound sulfur-containing substituents are sulfonate (—S(O)$_2$O$^-$M$^+$), sulfinate (—S(O)O$^-$M$^+$), sulfenate (—SO$^-$M$^+$) and oxysulfonate (—OS(O)$_2$O$^-$M$^+$), wherein M can be any monovalent ion such as Na, Li, K, or NR$^1_3$ (wherein R$^1$ is hydrogen or an alkyl). Another example of a covalently bound substituent is sulfate ion. Sulfonate is the preferred ionic group. The modifying agent should not include or introduce any multivalent ions into the phenolic resin dispersion since it is expected that the presence of multivalent ions would cause the phenolic resin to precipitate rather than remain dispersed.

The reaction-enabling functional moiety of the modifying agent can be any functional group that provides a site on the modifying agent for undergoing condensation with a phenolic resin. If the phenolic resin precursor is a resole, the modifying agent reacts with an alkylol or benzyl ether group of the resole. If the modifying agent is aromatic, the reaction-enabling functional moiety is a substituent on the aromatic ring that causes a site on the ring to be reactive to the alkylol or benzyl ether of the resole precursor. An example of such a substituent is a hydroxy or hydroxyalkyl, with hydroxy being preferred. The hydroxy- or hydroxyalkyl-substituted aromatic modifying agent is reactive at a site ortho and/or para to each hydroxy or hydroxyalkyl substituent. In other words, the aromatic modifying agent is bonded to, or incorporated into, the phenolic resin precursor at sites on the aromatic ring of the modifying agent that are ortho and/or para to a hydroxy or hydroxyalkyl substituent. At least two reaction-enabling functional moieties are preferred to enhance the reactivity of the aromatic modifying agent with the phenolic resin precursor.

Alternatively, the reaction-enabling functional moiety of the modifying agent can be a formyl group (—CHO), preferably attached to a carbon atom of an aromatic ring. In this instance, the phenolic resin precursor is a novolak rather than a resole. The novolak precursor is reacted via an acid catalyzed aldehyde condensation reaction with the formyl group-containing modifying agent so that the formyl group forms a divalent methylene linkage to an active site on an aromatic ring of the backbone structure of the novolak precursor. Consequently, the modifying agent structure (including the ionic moiety) is incorporated into the phenolic structure through the generated methylene linkage. Examples of such fdrmyl group-containing modifying agents include 2-formylbenzene sulfonate, 5-formylfuran sulfonate and (R)(SO$_3$)CH—CH$_2$—C(O)(H) compounds wherein R is C$_1$-C$_4$ alkyl groups.

Another alternative reaction-enabling functional moiety could be a diazo group (—N$_2^+$), preferably attached to a carbon atom of an aromatic ring. In this instance, the phenolic resin precursor is a novolak rather than a resole. The novolak precursor is reacted via a diazo coupling reaction with the diazo group-containing modifying agent so that the diazo group forms a divalent diazo linkage (—N=) to an active site on an aromatic ring of the backbone structure of the novolak precursor. Consequently, the modifying agent structure (including the ionic moiety) is incorporated into the phenolic structure through the diazo linkage. An example of such a diazo modifying agent is 1-diazo-2-naphthol-4-sulfonic acid.

The modifying agent also can optionally include a functional moiety that is capable of chelating with a metal ion that is present on a substrate surface on which the phenolic resin dispersion is applied. The chelating group remains as a residual group after the condensation of the phenolic resin precursor and the aromatic modifying agent. Typically, the chelating group is a substituent on the aromatic ring that is capable of forming a 5- or 6-membered chelation structure with a metal ion. Examples of such substituents include hydroxy and hydroxyalkyl, with hydroxy being preferred. At least two such functional groups must be present on the modifying agent molecule to provide the chelating. In the case of an aromatic modifying agent, the chelating groups should be located in an ortho position relative to each other. A significant advantage of the invention is that hydroxy or hydroxyalkyl substituents on the aromatic modifying agent can serve two roles—condensation enablement and subsequent metal chelating.

An aromatic modifying agent is particularly advantageous. Preferably, the ionic group and the reaction-enabling moiety are not substituents on the same aromatic ring. The ionic group, particularly sulfonate, appears to have a strong deactivating effect on condensation reactions of the ring to which it is attached. Consequently, an ionic group attached to the same ring as the reaction-enabling moiety would not allow the modifying agent to readily react with the phenolic resin precursor. However, it should be recognized that this consideration for the location of the ionic and reaction-enabling moieties is not applicable to the formyl group-containing modifying agent and diazo modifying agent.

A preferred structure for the aromatic modifying agent is represented by formulae Ia or Ib below:

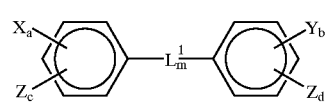

Formula Ia

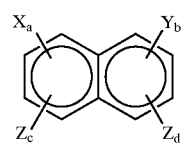

Formula Ib wherein X is the ionic group; Y is the reaction-enabling substituent; Z is the chelating substituent; L$^1$ is a divalent linking group such as an alkylene radical (for example, methylene) or a diazo (—N=N—); a is 1; b is 1 to 4; m is 0 or 1; and c and d are each independently 0 to 3, provided there are not more than 4 substituents on each aromatic ring.

If a chelating group Z is present it is positioned ortho to another chelating group Z or to Y. It should be recognized that the reaction-enabling substituent Y may also act as a chelating substituent. In this instance, the aromatic modifying agent may not include an independent chelating substituent Z. An aromatic modifying agent according to formulae Ia or Ib could also include other substituents provided they do not adversely interfere with the ionic group or the condensation reaction.

Illustrative aromatic modifying agents include salts of 6,7-dihydroxy-2-napthalenesulfonate; 6,7-dihydroxy-1-naphthalenesulfonate; 6,7-dihydroxy-4-napthalenesulfonate; Acid Red 88; Acid Alizarin Violet N; Erichrome Black T; Erichrome Blue Black B; Brilliant Yellow; Crocein Orange G; Biebrich Yellow; and Palatine Chrome Black 6BN. 6,7-dihydroxy-2-naphthalenesulfonate, sodium salt is the preferred aromatic modifying agent.

It should be recognized that the preferred sulfonate modification contemplated herein involves an indirect sulfonation mechanism. In other words, the aromatic modifying agent includes a sulfonate group and is reacted with another aromatic compound (the phenolic resin precursor) to obtain the chain extended, sulfonate-modified phenolic resin product. This indirect sulfonation is distinctly different than direct sulfonation of the phenolic resin precursor.

Any phenolic resin could be employed as the phenolic resin precursor, but it has been found that resoles are especially suitable. The resole precursor should have a sufficient amount of active alkylol or benzyl ether groups that can initially condense with the modifying agent and then undergo further subsequent condensation. Of course, the phenolic resin precursor has a lower molecular weight than the final dispersed resin since the precursor undergoes condensation to make the final dispersed resin. Resoles are prepared by reacting a phenolic compound with an excess of an aldehyde in the presence of a base catalyst. Resole resins are usually supplied and used as reaction product mixtures of monomeric phenolic compounds and higher molecular weight condensation products having alkylol (—ArCH$_2$—OH) or benzyl ether termination (—ArCH$_2$—O—CH$_2$Ar), wherein Ar is an aryl group. These resole mixtures or prepolymers (also known as stage A resin) can be transformed into three-dimensional, crosslinked, insoluble and infusible polymers by the application of heat.

The reactants, conditions and catalysts for preparing resoles suitable for the resole precursor of the present invention are well-known. The phenolic compound can be any of those previously listed or other similar compounds, although multi-hydroxy phenolic compounds are undesirable. Particularly preferred phenolic compounds for making the resole precursor include phenol per se and alkylated phenol. The aldehyde also can be any of those previously listed or other similar compounds, with formaldehyde being preferred. Low molecular weight, water soluble or partially water soluble resoles are preferred as the precursor because such resoles maximize the ability to condense with the modifying agent. The F/P ratio of the resole precursor should be at least 0.90. Illustrative commercially available resoles that are suitable for use as a precursor include a partially water soluble resole available from Georgia Pacific under the trade designation BRL 2741 and a partially water soluble resoles available from Schenectady International under the trade designations HRJ11722 and SG3100.

As described above, the dispersed phenolic resin reaction product according to the invention can be hydrophilic or hydrophobic, but hydrophilic is preferred. In addition, dispersed resoles or novolaks can be obtained depending upon the selection and amount of reactants.

Preferably, the dispersed resole is produced by reacting or mixing 1 mol of modifying agent(s) with 1 to 20 mol of phenolic resin precursor(s). A dispersed resole typically can be obtained by reacting or mixing a resole precursor or a mixture of resole precursors with the modifying agent or a mixture of agents without any other reactants, additives or catalysts. However, other reactants, additives or catalysts can be used as desired. Multi-hydroxy phenolic compound (s) can optionally be included in relatively small amounts in the reactant mixture for the resole.

Hydrophilic resoles typically have a F/P ratio of at least 1.0. According to the invention, hydrophilic resoles having a F/P ratio much greater than 1.0 can be successfully dispersed. For example, it is possible to make an aqueous dispersion of hydrophilic resoles having a F/P ratio of at least 2 and approaching 3, which is the theoretical F/P ratio limit.

Preferably, the dispersed novolak is produced by reacting 1 mol of modifying agent(s) with 2–20 mol of phenolic resin precursor(s) and, preferably, 2–20 mol of multi-hydroxy phenolic compound(s). An aldehyde compound, preferably formaldehyde, is also required to make the novolak. The aldehyde compound can optionally be added as a separate ingredient in the initial reaction mixture or the aldehyde compound can be generated in situ from the resole precursor. The resole precursor(s), multi-hydroxy phenolic compound (s) and modifying agent(s) co-condense to form the dispersed novolak. The reaction typically is acid catalyzed with an acid such as phosphoric acid. The F/P ratio of aldehyde compound(s) to combined amount of resole precursor(s) and multi-hydroxy phenolic compound(s) in the initial reaction mixture preferably is less than 0.9. Preferably, synthesis of the dispersed novolak is a two stage reaction. In the first stage, the resole precursor(s) is reacted with the modifying agent(s) and, optionally, a small amount of multi-hydroxy phenolic compound(s). Once this first stage reaction has reached the desired point (i.e. the resin can be readily formed into a translucent dispersion), the acid catalyst and a greater amount of multi-hydroxy phenolic compound(s) is added to the reaction mixture. Pyrocatechol (also simply known as catechol) is a preferred multi-hydroxy phenolic compound for reacting in the first stage and resorcinol is a preferred multi-hydroxy phenolic compound for reacting in the second stage.

Hydrophilic novolaks typically have a hydroxy equivalents of between 1 and 3 per aromatic ring. Preferably, dispersed hydrophilic novolaks according to the invention have a hydroxy equivalents of 1.1 to 2.5, more preferably 1.1 to 2.0. The hydroxy equivalents is calculated based on the amount of multi-hydroxy phenolic compounds used to make the novolak.

According to a preferred embodiment, the dispersed phenolic resin reaction product contains a mixture of oligomers having structures believed to be represented by the following formulae IIa or IIb:

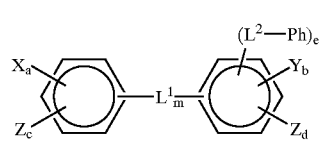

Formula IIa

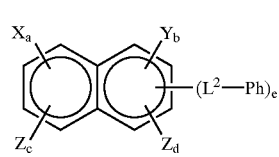

Formula IIb wherein X, Y, Z and L$^1$ and subscripts a, b, c, d and m are the same as in formulae Ia and Ib, e is 1 to 6, L$^2$ is a divalent linking group and Ph is the phenolic resin backbone structure, provided the —(L²—Ph) group(s) is(are) ortho or para to a Y group. L² depends upon the particular phenolic resin, but typically is a divalent alkylene radical such as methylene (—CH₂—) or oxydimethylene (—CH₂—O—CH₂—). Preferably, e is 2 and the —(L²—Ph) groups are in para position to each other.

According to a particularly preferred embodiment wherein the phenolic resin is a resole and the modifying agent is a naphthalene having a ionic pendant group X and two reaction-enabling substituents Y, the dispersed phenolic resin reaction product contains a mixture of oligomers having structures believed to be represented by the following formula III:

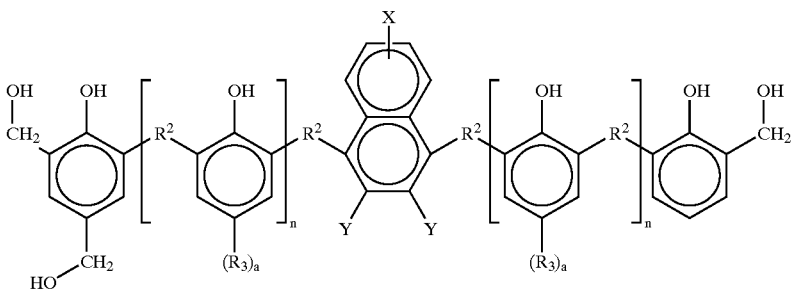

wherein X and Y are the same as in formulae Ia and Ib, a is 0 or 1; n is 0 to 5; $R^2$ is independently —C($R^5$)₂— or —C($R^5$)₂—O—C($R^5$)₂—, wherein $R^5$ is independently hydrogen, alkylol, hydroxyl, alkyl, aryl or aryl ether; and $R^3$ is independently alkylol, alkyl, aryl, alkylaryl or aryl ether. Preferably, $R^2$ is methylene or oxydimethylene and $R^3$ is methylol. If 6,7-dihydroxy-2-naphthalenesulfonate, sodium salt is the modifying agent, X will be $SO_3^-Na^+$ and each Y will be OH. It should be recognized that in this case the hydroxy groups for Y will also act as chelating groups with a metal ion.

According to another preferred embodiment wherein the phenolic resin is a novolak and the modifying agent is a naphthalene having a ionic pendant group X and two reaction-enabling substituents Y, the dispersed phenolic resin reaction product contains a mixture of oligomers having structures believed to be represented by the following formula IV:

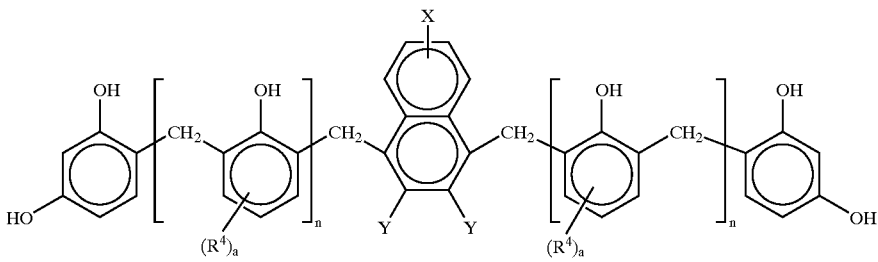

wherein X and Y are the same as in formulae Ia and Ib, a is 0 or 1, n is 0 to 5 and $R^4$ is independently hydroxyl, alkyl, aryl, alkylaryl or aryl ether. Preferably, $R^4$ is tert-butyl. If 6,7-dihydroxy-2-naphthalenesulfonate, sodium salt is the modifying agent, X will be $SO_3^-Na^+$ and each Y will be OH. In this case the hydroxy groups for Y will also act as chelating groups with a metal ion.

It should be recognized that the dispersed phenolic resin reaction product may contain oligomers.or compounds having structures that vary from the idealized structures shown in formulae III and IV.

If the modifying agent includes a sulfur-containing ionic group, the resulting modified phenolic resin should have a carbon/sulfur atom ratio of 20:1 to 200:1, preferably 20:1 to 100:1. If the sulfur content is greater than the 20:1 carbon/sulfur atom ratio, the modified phenolic resin begins to become water soluble, is more stable with respect to multivalent ions and is difficult to thermoset. These characteristics are adverse to the preferred use of the phenolic resin dispersion of the invention. If the sulfur content is below the 200:1 carbon/sulfur atom ratio, then the resin dispersion cannot maintain its stability. Viewed another way, the dispersed phenolic resins have 0.01 to 0.10, preferably 0.03 to 0.06, equivalents of sulfonate functionality/100 g resin. The aqueous dispersion of the phenolic resin preferably has a solids content of 1 to 50, preferably 15 to 30.

The modifying agent and the phenolic resin precursor can be reacted or mixed under conditions effective to promote condensation of the modifying agent with the phenolic resin precursor. The reaction is carried out in water under standard phenolic resin condensation techniques and conditions. The reactant mixture (including water) generally is heated from 50 to 100° C. under ambient pressure, although the specific temperature may differ considerably depending upon the specific reactants and the desired reaction product. The resulting product is a concentrate that is self-dispersible upon the addition of water and agitation to reach a desired solids content. The final dispersion can be filtered to remove any gelled agglomerations.

The intermediate modified resoles or novolaks that are initially produced in the synthesis are not necessarily water dispersible, but as the chain extension is advanced the resulting chain extended modified resoles or novolaks become progressively more water dispersible by simple mechanical agitation. The chain extension for the dispersed resole is determined by measuring the viscosity of the reaction mixture. Once the resole reaction mixture has a reached the desired viscosity, which varies depending upon the reactant composition, the reaction is stopped by removing the heat. The chain extension for the dispersed novolak is determined by pre-selecting the F/P ratio of the total reaction mixture (in other words, the amount of aldehyde compound(s) relative to the amount of phenolic(s) in both the first and second stages). The reaction for the novolak is allowed to proceed until substantially all the total amount of the reactants have reacted. In other words, there is essentially no unreacted reactant remaining. Preferably, the molecular weight (i.e., chain extension) of both the resole and novolak should be advanced to just below the gel point.

The phenolic resin dispersion (A) can be present in the primer or coating composition in any amount. Preferably, it is present in an amount of 1 to 30, more preferably, 8 to 15, based on the total weight of the non-volatile components of the composition.

The flexibilizer (B) is any material that contributes flexibility and/or toughness to the film formed from the composition. The toughness provided by the flexibilizer provides fracture resistance to the film. The flexibilizer should be non-glassy at ambient temperature and be an aqueous emulsion latex or aqueous dispersion that is compatible with the phenolic resin dispersion (A). The flexibilizer preferably is formulated into the composition in the form of an aqueous emulsion latex or aqueous dispersion Suitable flexibilizers include aqueous latices, emulsions or dispersions of (poly)butadiene, neoprene, styrene-butadiene rubber, acrylonitrile-butadiene rubber (also known as nitrile rubber), halogenated polyolefin, acrylic polymer, urethane polymer, ethylene-propylene copolymer rubber, ethylene-propylene-diene terpolymer rubber, styrene-acrylic copolymer, polyamide, poly(vinyl acetate) and the like. Halogenated polyolefins, nitrile rubbers and styrene-acrylic copolymers are preferred.

A suitable styrene-acrylic polymer latex is commercially available from Goodyear Tire & Rubber under the trade designation PLIOTEC and described, for example, in U.S. Pat. Nos. 4,968,741; 5,122,566 and 5,616,635. According to U.S. Pat. No. 5,616,635, such a copolymer latex is made from 45–85 weight percent vinyl aromatic monomers, 15–50 weight percent of at least one alkyl acrylate monomer and 1–6 weight percent unsaturated carbonyl compound. Styrene is the preferred vinyl aromatic monomer, butyl acrylate is the preferred acrylate monomer and acrylic acid and methacrylic acid are the preferred unsaturated carbonyl compound. The mixture for making the latex also includes at least one phosphate ester surfactant, at least one water-insoluble nonionic surface active agent and at least one free radical initiator.

If nitrile rubber is the flexibilizer, it is preferably mixed into the composition as an emulsion latex. It is known in the art that nitrile rubber emulsion latices are generally made from at least one monomer of acrylonitrile or an alkyl derivative thereof and at least one monomer of a conjugated diene, preferably butadiene. According to U.S. Pat. No. 4,920,176 the acrylonitrile or alkyl derivative monomer should be present in an amount of 0 or 1 to 50 percent by weight based on the total weight of the monomers. The conjugated diene monomer should be present in an amount of 50 percent to 99 percent by weight based on the total weight of the monomers. The nitrile rubbers can also optionally include various co-monomers such as acrylic acid or various esters thereof, dicarboxylic acids or combinations thereof. The polymerization of the monomers typically is initiated via free radical catalysts. Anionic surfactants typically are also added. A suitable nitrile rubber latex is available from B.F. Goodrich under the trade designation HYCAR.

Representative halogenated polyolefins include chlorinated natural rubber, chlorine- and bromine-containing synthetic rubbers including polychloroprene, chlorinated polychloroprene, chlorinated polybutadiene, hexachloropentadiene, butadiene/halogenated cyclic conjugated diene adducts, chlorinated butadiene styrene copolymers, chlorinated ethylene propylene copolymers and ethylene/propylene/non-conjugated diene terpolymers, chlorinated polyethylene, chlorosulfonated polyethylene, poly(2,3-dichloro-1,3-butadiene), brominated poly(2,3-dichloro-1,3-butadiene), copolymers of α-haloacrylonitriles and 2,3-dichloro-1,3-butadiene, chlorinated poly(vinyl chloride) and the like including mixtures of such halogen-containing elastomers.

Latices of the halogenated polyolefin can be prepared according to methods known in the art such as by dissolving the halogenated polyolefin in a solvent and adding a surfactant to the resulting solution. Water can then be added to the solution under high shear to emulsify the polymer. The solvent is then stripped to obtain a latex. The latex can also be prepared by emulsion polymerization of the halogenated ethylenically unsaturated monomers.

Butadiene latices are particularly preferred as the flexibilizer (B). Methods for making butadiene latices are well-known and are described, for example, in U.S. Pat. Nos. 4,054,547 and 3,920,600, both incorporated herein by reference. In addition, U.S. Pat. Nos. 5,200,459; 5,300,555; and 5,496,884 disclose emulsion polymerization of butadiene monomers in the presence of polyvinyl alcohol and a co-solvent such as an organic alcohol or a glycol.

The butadiene monomers useful for preparing the butadiene polymer latex can essentially be any monomer containing conjugated unsaturation. Typical monomers include 2,3-dichloro-1,3-butadiene; 1,3-butadiene; 2,3-dibromo-1,3-butadiene isoprene; isoprene; 2,3-dimethylbutadiene; chloroprene; bromoprene; 2,3-dibromo-1,3-butadiene; 1,1,2-trichlorobutadiene; cyanoprene; hexachlorobutadiene; and combinations thereof. It is particularly preferred to use 2,3-dichloro-1,3-butadiene since a polymer that contains as its major portion 2,3-dichloro-1,3-butadiene monomer units has been found to be particularly useful in adhesive applications due to the excellent bonding ability and barrier properties of the 2,3-dichloro-1,3-butadiene-based polymers. As described above, an especially preferred embodiment of the present invention is one wherein the butadiene polymer includes at least 60 weight percent, preferably at least 70 weight percent, 2,3-dichloro-1,3-butadiene monomer units.

The butadiene monomer can be copolymerized with other monomers. Such copolymerizable monomers include α-haloacrylonitriles such as α-bromoacrylonitrile and α-chloroacrylonitrile; α,β-unsaturated carboxylic acids such as acrylic, methacrylic, 2-ethylacrylic, 2-propylacrylic, 2-butylacrylic and itaconic acids; alkyl-2-haloacrylates such as ethyl-2-chloroacrylate and ethyl-2-bromoacrylate; α-bromovinylketone; vinylidene chloride; vinyl toluenes; vinylnaphthalenes; vinyl ethers, esters and ketones such as methyl vinyl ether, vinyl acetate and methyl vinyl ketone; esters amides, and nitriles of acrylic and methacrylic acids such as ethyl acrylate, methyl methacrylate, glycidyl acrylate, methacrylamide and acrylonitrile; and combinations of such monomers. The copolymerizable monomers, if utilized, are preferably α-haloacrylonitrile and/or α,β-unsaturated carboxylic acids. The copolymerizable monomers may be utilized in an amount of 0.1 to 30 weight percent, based on the weight of the total monomers utilized to form the butadiene polymer.

In carrying out the emulsion polymerization to produce the latex other optional ingredients may be employed during the polymerization process. For example, conventional anionic and/or nonionic surfactants may be utilized in order to aid in the formation of the latex. Typical anionic surfactants include carboxylates such as fatty acid soaps from lauric, stearic, and oleic acid; acyl derivatives of sarcosine such as methyl glycine; sulfates such as sodium lauryl sulfate; sulfated natural oils and esters such as Turkey Red Oil; alkyl aryl polyether sulfates; alkali alkyl sulfates; ethoxylated aryl sulfonic acid salts; alkyl aryl polyether sulfonates; isopropyl naphthalene sulfonates; sulfosuccinates; phosphate esters such as short chain fatty alcohol partial esters of complex phosphates; and orthophosphate esters of polyethoxylated fatty alcohols. Typical nonionic surfactants include ethoxylated (ethylene oxide) derivatives such as ethoxylated alkyl aryl derivatives; mono- and polyhydric alcohols; ethylene oxide/propylene oxide block copolymers; esters such as glyceryl monostearate; products of the dehydration of sorbitol such as sorbitan monostearate and polyethylene oxide sorbitan monolaurate; amines; lauric acid; and isopropenyl halide. A conventional surfactant, if utilized, is employed in an amount of 0.01 to 5 parts, preferably 0.1 to 2 parts, per 100 parts by weight of total monomers utilized to form the butadiene polymer.

In the case of dichlorobutadiene homopolymers, anionic surfactants are particularly useful. Such anionic surfactants include alkyl sulfonates and alkyl aryl sulfonates (commercially available from Stepan under the trade designation POLYSTEP) and sulfonic acids or salts of alkylated diphenyl oxide (for example, didodecyl diphenyleneoxide disulfonate or dihexyl diphenyloxide disulfonate commercially available from Dow Chemical Co. under the trade designation DOWFAX).

Chain transfer agents may also be employed during emulsion polymerization in order to control the molecular weight of the butadiene polymer and to modify the physical properties of the resultant polymer as is known in the art. Any of the conventional organic sulfur-containing chain transfer agents may be utilized such as alkyl mercaptans and dialkyl xanthogen disulfides.

The emulsion polymerization is typically triggered by a free radical initiator. Illustrative free radical initiators include conventional redox systems, peroxide systems, azo derivatives and hydroperoxide systems. The use of a redox system is preferred and examples of such systems include ammonium persulfate/sodium metabisulfite, ferric sulfate/ascorbic acid/hydroperoxide and tributylborane/hydroperoxide, with ammonium persulfate/sodium metabisulfite being most preferred.

The emulsion polymerization is typically carried out at a temperature of 10°–90° C., preferably 40°–60° C. Monomer conversion usually ranges from 70–100, preferably 80–100, percent. The latices preferably have a solids content of 10 to 70, more preferably 30 to 60, percent; a viscosity between 50 and 10,000 centipoise at 25° C.; and a particle size between 60 and 300 nanometers.

Especially preferred as the butadiene latex is a butadiene polymer that has been emulsion polymerized in the presence of a styrene sulfonic acid, styrene sulfonate, poly(styrene sulfonic acid), or poly(styrene sulfonate) stabilizer to form the latex. Poly(styrene sulfonate) is the preferred stabilizer. This stabilization system is particularly effective for a butadiene polymer that is derived from at least 60 weight percent dichlorobutadiene monomer, based on the amount of total monomers used to form the butadiene polymer. The butadiene polymer latex can be made by known emulsion polymerization techniques that involve polymerizing the butadiene monomer (and copolymerizable monomer, if present) in the presence of water and the styrene sulfonic acid, styrene sulfonate, poly(styrene sulfonic acid), or poly (styrene sulfonate) stabilizer. The sulfonates can be salts of any cationic groups such as sodium, potassium or quaternary ammonium. Sodium styrene sulfonate is a preferred styrene sulfonate compound. Poly(styrene sulfonate) polymers include poly(styrene sulfonate) homopolymer and poly (styrene sulfonate) copolymers such as those with maleic anhydride. Sodium salts of poly(styrene sulfonate) are particularly preferred and are commercially available from National Starch under the trade designation VERSA TL. The poly(styrene sulfonate) can have a weight average molecular weight from $5 \times 10^4$ to $1.5 \times 10^6$, with $1.5 \times 10^5$ to $2.5 \times 10^5$ being preferred. In the case of a poly(styrene sulfonate) or poly(styrene sulfonic acid) it is important to recognize that the emulsion polymerization takes place in the presence of the pre-formed polymer. In other words, the butadiene monomer is contacted with the pre-formed poly(styrene sulfonate) or poly(styrene sulfonic acid). The stabilizer preferably is present in an amount of 0.1 to 10 parts, preferably 1 to 5 parts, per 100 parts by weight of total monomers utilized to form the butadiene polymer.

The flexibilizer (B) preferably is present in the composition in an amount of 5 parts by weight to 300 parts by weight, based on 100 parts by weight phenolic resin dispersion. More preferably, the flexibilizer is present in an amount of 25 parts by weight to 100 parts by weight, based on 100 parts by weight phenolic resin dispersion.

The composition also can optionally include ingredients known to be useful in adhesive compositions. A particular useful optional component is a metal oxide such as zinc oxide, magnesium oxide, lead oxide, iron oxide, cadmium oxide, zirconium oxide and calcium oxide, with zinc oxide and magnesium oxide being preferred. Lead oxide is not preferred due to environmental concerns. The metal oxides are well-known articles of commerce. The metal oxide is formulated into the composition in finely divided form or as a dispersion in an aqueous carrier. Another useful ingredient is mica.

Other possible conventional additives include such as inert filler material, pigments, plasticizers, dispersing agents, wetting agents, reinforcing agents and the like in amounts conventionally utilized. Examples of such conventional additives include carbon black, silica, sodium aluminosilicate, titanium dioxide and organic pigments and dyestuffs. The composition of the invention preferably does not include any acid.

As mentioned above, one preferred embodiment of the composition is a primer for bonding a metallic surface to a polymeric surface that includes a novolak version of the phenolic resin dispersion (A), the flexibilizer (B), and (C) an aldehyde, preferably formaldehyde, donor compound that is capable of crosslinking the novolak resin.

The viscosity of the adhesive primer composition is not critical provided it is sufficient to withstand dripping and/or sagging. Typically, the adhesive primer may have a viscosity of 30 to 150 centipoise at 25° C.

The aldehyde donor can be essentially be any type of aldehyde known to react with hydroxy aromatic compounds to form cured or crosslinked novolak phenolic resins. Typical compounds useful as a aldehyde (e.g., formaldehyde) source in the present invention include formaldehyde and aqueous solutions of formaldehyde, such as formalin; acetaldehyde; propionaldehyde; isobutyraldehyde; 2-ethylhexaldehyde; 2-methylpentaldehyde;

2-ethylhexaldehyde; benzaldehyde; as well as compounds which decompose to formaldehyde, such as paraformaldehyde, trioxane, furfural, hexamethylenetetramine, anhydromaldehydeaniline, ethylene diamine formaldehyde; acetals which liberate formaldehyde on heating; methylol derivatives of urea and formaldehyde; methylol phenolic compounds; and the like. The formaldehyde source is utilized in an amount ranging from about 5 parts by weight to 100 parts by weight, preferably from about 10 parts by weight to 70 parts by weight, based on 100 parts by weight phenolic resin dispersion.

Additionally, , high molecular weight aldehyde homopolymers and copolymers can be employed as a latent formaldehyde source in the practice of the present invention. A latent formaldehyde source herein refers to a formnaldehyde source which will release formaldehyde only in the presence of heat such as the heat applied during the curing of an adhesive system. Typical high molecular weight aldehyde homopolymers and copolymers include (1) acetal homopolymers, (2) acetal copolymers, (3) gamma-polyoxymethylene ethers having the characteristic structure:

and (4) polyoxymethylene glycols having the characteristic structure:

wherein $R_{10}$ and $R_{11}$ can be the same or different and each is an alkyl group having from about 1 to 8, preferably 1 to 4, carbon atoms, $R_{12}$ and $R_{13}$ can be the same or different and each is an alkylene group having from 2 to 12, preferably 2 to 8, carbon atoms; n is greater than 100, and is preferably in the range from about 200 to about 2000; and x is in the range from about 0 to 8, preferably 1 to 4, with at least one x being equal to at least 1. The high molecular weight aldehyde homopolymers and copolymers are further characterized by a melting point of at least 75° C., i.e. they are substantially inert with respect to the phenolic system until heat activated; and by being substantially completely insoluble in water at a temperature below the melting point. The acetal homopolymers and acetal copolymers are well-known articles of commerce. The polyoxymethylene materials are also well known and can be readily synthesized by the reaction of monoalcohols having from 1 to 8 carbon atoms or dihydroxy glycols and ether glycols with polyoxymethylene glycols in the presence of an acidic catalyst. A representative method of preparing these crosslinking agents is described in U.S. Pat. No. 2,512,950, which is incorporated herein by reference. Gamma-polyoxymethylene ethers are generally preferred sources of latent formaldehyde and a particularly preferred latent formaldehyde source for use in the practice of the invention is 2-polyoxymethylene dimethyl ether.

As mentioned above, another preferred embodiment of the composition is a coating for a metallic surface that includes a resole version of the phenolic resin dispersion (A) and the flexibilizer (B). This coating can also be used as primer for polymeric-to-metal adhesion. Accordingly, the coating can be applied to substantially all of a metallic surface and then a portion of that coating-covered surface can be topcoated with a covercoat and then bonded to a polymeric surface. This single coating/primer composition provides significant corrosion protection under the bonded portion and in the exposed portion. According to conventional practices prior to this invention, the entire metal surface of a substrate is first coated with a protective coating and then only that portion intended for bonding must be coated with a primer having a composition different than that of the protective coating. Alternatively, the primer and adhesive are applied to the bonding area and then the resulting bonded assembly is post-painted with a protective coating. The invention provides a distinct processing advantage since the same composition can be used for both protective coating and priming for bonding on a metal surface and it eliminates the need for post-painting. Consequently, it is easier to ensure that the whole metal substrate or part has adequate corrosion protection.

The viscosity of the coating composition is not critical provided it is sufficient to withstand dripping and/or sagging. Typically, the coating composition can have a viscosity of less than 25 centipoise at 25° C. Substantial elimination of dripping and/or sagging at such low viscosities is another benefit of the present invention.

A preferred optional component in the resole coating composition is a polyvinyl alcohol-stabilized aqueous resole dispersion. This dispersion can be prepared by a process that includes mixing the pre-formed, solid, substantially water-insoluble, resole resin; an organic coupling agent; and polyvinyl alcohol, at a temperature and for a period of time sufficient to form a dispersion of the resole in water. Such polyvinyl alcohol-stabilized resoles are described in more detail in U.S. Pat. No. 4,124,554, incorporated herein by reference, and are available commercially from Georgia Pacific under the trade designation BKUA-2370 and BKUA-2392. According to U.S. Pat. No. 4,124,554, the water-insoluble resole is produced by reacting formaldehyde with bisphenol-A in a mol ratio of 2 to 3.75 moles of formaldehyde per mole of bisphenol-A in the presence of a catalytic amount of an alkali metal or barium oxide or hydroxide condensation catalyst wherein the reaction is carried out at elevated temperatures. The condensation product is the neutralized to a pH of 3 to 8. Alcohols, glycol ethers, ethers, esters and ketones are the most useful coupling solvents. Specific examples of useful coupling solvents include ethanol, n-propanol, isopropyl alcohol, ethylene glycol monobutyl ether, ethylene glycol monoisobutyl ether, ethylene glycol monomethyl ether acetate, diethylene glycol monobutyl ether, diethylene glycol monoethyl ether acetate, propylene glycol monopropyl ether, methoxy acetone, and the like. The polyvinyl alcohol is typically prepared by hydrolysis of polyvinyl acetate. The most useful polyvinyl alcohol polymers are hydrolyzed to an extent of 85 to 91 percent and have molecular weights such that a 4 percent solids solution of the polyvinyl alcohol in water has a viscosity of 4 to 25 centipoises at 25° C. The polyvinyl alcohol-stabilized resole dispersion, if present, typically is used in an amount of 10 parts by weight to 800 parts by weight, preferably 100 parts by weight to 800 parts by weight, based on 100 parts by weight of the phenolic resin dispersion (A).

Water, preferably deionized water, is utilized in combination with the phenolic resin dispersion (A), flexibilizer (B) and any optional components of the invention in order to provide a composition having a final solids content of 5 to 50, preferably 15 to 30, weight percent. Since the coating or primer composition is waterborne it is substantially free of volatile organic compounds.

The compositions may be prepared by any method known in the art, but are preferably prepared by combining and milling or shaking the ingredients and water in ball-mill, sand-mill, ceramic bead-mill, steel-bead mill, high speed media-mill or the like. It is preferred to add each component to the mixture in a liquid form such as an aqueous dispersion.

The composition may be applied to a substrate surface by any conventional method such as spraying, dipping, brushing, wiping, roll-coating (including reverse roll-coating) or the like, after which the composition typically is permitted to dry. Although conventional application methods can be used, the composition can be applied via autodeposition. The phenolic resin dispersion (A) of composition of the invention enables autodeposition of the composition in the presence of multivalent ions. The general principles and advantages of autodeposition is explained in a multitude of patents assigned to Parker Amchem and/or Henkel (see, for example, U.S. Pat. Nos. 4,414,350; 4,994,521; 5,427,863; 5,061,523 and 5,500,460). Autodepositable compositions usually are applied by dipping the metallic substrate or part into a bath of the composition. The metal substrate can reside in the primer or coating composition bath for an amount of time sufficient to deposit a uniform film of desired thickness. Typically, the bath residence time is from about 5 to about 120 seconds, preferably about 10 to about 30 seconds, and occurs at room temperature. The composition typically is applied to form a dry film thickness of 10 to 30 µm.

According to the present invention when the composition is applied to an electrochemically active metal surface that has been activated so that there are multivalent ions present on the surface the multivalent ions appear to cause the composition to deposit on the metal surface a self-limiting, substantially uniform, gelatinous, wet film. The coating that is formed when the composition is in contact with the metal surface is known as the "uncured" state. The subsequent drying of the coating converts the coating to a "cured" stage. The formation of the coating is "self-limiting" in that the coating increases in thickness and areal density (mass per unit area) the longer the time the metal surface is immersed in the autodepositable composition.

The autodeposition characteristic of the invention is important to provide corrosion and environmental resistance. It allows for the formation of an exceptionally uniform and thin protective barrier. Excellent corrosion and environmental resistance is possible only if the entire surface of a metal part is protected with a barrier coating. This requirement is usually difficult to achieve on substrate surfaces that have a very complex topology. With the superior autodeposition of this invention, wetting and thus protection of such complex surfaces is achieved.

Another important advantage of the primer or coating composition is that a bath of the composition does not appear to change in composition as cumulative metal surfaces are dipped in the bath over a period of time. It is believed that since the very hydrophilic phenolic resin dispersion immobolizes or coagulates on the surface as a swollen wet gel rather than as a precipitate, the composition of the bath is the same as the deposited wet gel and the bath is not depleted.

Activation of the metallic surface to prepare it for receiving the autodepositable composition can be achieved by pretreating the surface with an activating composition that generates freely-available multivalent ions on the surface. The activating composition can be an aqueous solution of multivalent ions such as calcium, magnesium, iron and manganese.

The activating composition can also be an autodepositable, aqueous metal treatment composition that includes (A') an aqueous dispersion of a phenolic novolak resin that includes water and a reaction product of a phenolic resin precursor, a modifying agent and a multi-hydroxy phenolic compound wherein the modifying agent includes at least one functional moiety that enables the modifying agent to react with the phenolic resin precursor and at least one ionic moiety, (B') an acid and, optionally, (C') a flexibilizer. The phenolic novolak dispersion and the flexibilizer can be the same as described above in connection with the primer or coating composition. The aqueous metal treatment composition is described in more detail in commonly-owned U.S. Provisional Patent Application No. 60/072,782 titled "Aqueous Metal Treatment Composition" (Attorney Docket No. IR-2486(CE)), filed Jan. 27, 1998 and incorporated herein by reference.

The acid (B') of the metal treatment composition can be any acid that is capable of reacting with a metal to generate multivalent ions. Illustrative acids include hydrofluoric acid, phosphoric acid, sulfuric acid, hydrochloric acid and nitric acid. In the case of steel the multivalent ions will be ferric and/or ferrous ions. Aqueous solutions of phosphoric acid are preferred. When the acid is mixed into the composition presumably the respective ions are formed and exist as independent species in addition to the presence of the free acid. In other words, in the case of phosphoric acid, phosphate ions and free phosphoric acid co-exist in the formulated final multi-component composition. The acid preferably is present in an amount of 5 to 300 parts by weight, more preferably 10 to 160 parts by weight, based on 100 parts by weight of the phenolic novolak resin dispersion (A').

The flexibilizer (C') of the metal treatment composition, if present, preferably is included in the composition in an amount of 5 parts by weight to 300 parts by weight, based on 100 parts by weight phenolic novolak resin dispersion (A'). More preferably, the flexibilizer is present in an amount of 25 parts by weight to 100 parts by weight, based on 100 parts by weight the phenolic novolak resin dispersion (A').

Since the dispersed phenolic resin (A') of the metal treatment composition is a novolak, a curative must be introduced in order to cure the film formed by the metal treatment composition. The curative can be an aldehyde donor compound that is present in the primer of the invention. When the curative-containing primer is applied over the metal treatment, the curative cures the metal treatment composition. It has been found that the formaldehyde species generated from the resole present in the primer appear to co-cure the novolak in the metal treatment coating via diffusion.

It has also been found that the addition of a control agent to the metal treatment composition described in commonly-owned U.S. Provisional Patent Application No. 60/072,782 titled "Aqueous Metal Treatment Composition" dramatically improves uniform coating formation on more complex surface topography and enhances the autodeposition of subsequently-applied compositions thus improving corrosion resistance and overall robustness. The protective coating formed by the composition of the invention is particularly useful for providing corrosion resistance to metal substrates that are subjected to significant stresses and/or strains causing significant flexing or movement of the substrate surface. Due to the improved deposition caused by the control agent, the concentration of active ingredients in an autodepositable composition that includes the control agent can be reduced. Another advantage of the invention is that there is no need to post-rinse the treated surface in order to remove any control agent residue. Furthermore, the control agent eliminates or substantially eliminates the ambient staging period thus improving process efficiency.

The control agent is any material that is able to improve the formation of an autodeposited coating on a metallic surface and, optionally, improve the formation of another autodeposited coating (such as the primer or coating of the invention) applied after the control agent-containing autodeposited coating. Addition of the control agent also increases the uniformity of the thickness of the autodeposited coating. The control agent-containing composition does not require an ambient staging period in order to develop fully the coating. In other words, the metallic coating conversion is complete upon drying of the coated substrate and any subsequent coating, primer or adhesive compositions can be applied immediately after coating and drying of the control agent-containing composition. The control agent also must be compatible with the other components of the composition under acidic conditions without prematurely coagulating or destabilizing the composition.

The control agent may be a nitro compound, a nitroso compound, an oxime compound, a nitrate compound, or a similar material. A mixture of control agents may be used. Organic nitro compounds are the preferred control agents.

The organic nitro compound is any material that includes a nitro group ($-NO_2$) bonded to an organic moiety. Preferably, the organic nitro compound is water soluble or, if water insoluble, capable of being dispersed in water. Illustrative organic nitro compounds include nitroguanidine; aromatic nitrosulfonates such as nitro or dinitrobenzenesulfonate and the salts thereof such as sodium, potassium, amine or any monovalent metal ion (particularly the sodium salt of 3,5-dinitrobenzenesulfonate); Naphthol Yellow S; and picric acid (also known as trinitrophenol). Especially preferred for commercial availability and regulatory reasons is a mixture of nitroguanidine and sodium nitrobenzenesulfonate.

The amount of control agent(s) in the metal treatment composition may vary, particularly depending upon the amount of any acid in the composition. Preferably, the amount is up to 20 weight %, more preferably up to 10 weight %, and most preferably 2 to 5 weight %, based on the total amount of non-volatile ingredients in the metal treatment composition. According to a preferred embodiment, the weight ratio of nitroguanidine to sodium nitrobenzenesulfonate should range from 1:10 to 5:1.

The organic nitro compound typically is mixed into the composition in the form of an aqueous solution or dispersion. For example, nitroguanidine is a solid at room temperature and is dissolved in water prior to formulating into the composition.

If conventional applications methods are used for the primer or coating of the invention, the metallic surface may be pre-treated prior to application of the composition via well-known conversion techniques. Conversion coating generally involves treating the surface with chemicals that form a metal phosphate and/or metal oxide conversion coating on the metal surface. The conversion coating provides protection against corrosion and can enhance adhesion of any subsequent coatings. Phosphatizing is an example of a well-established conversion process. Another conversion process is applying the above-described metal treatment composition.

Curing of the primer or coating composition to form a highly crosslinked thermoset on the metallic surface can be accomplished by heating. The degree of heating will vary depending upon the specific composition, but in general the coated composition should be exposed to a temperature of 250 to 400° F. for 5 minutes to one hour.

The primer composition can be used to bond any types of adherends together, but it is particularly useful to bond a metal surface to a polymeric material surface. The polymeric material can be any elastomeric material selected from any of the natural rubbers and olefinic synthetic rubbers including polychloroprene, polybutadiene, neoprene, styrene-butadiene copolymer rubber, acrylonitrile-butadiene copolymer rubber, ethylene-propylene copolymer rubber (EPM), ethylene-propylene-diene terpolymer rubber (EPDM), butyl rubber, brominated butyl rubber, alkylated chlorosulfonated polyethylene and the like. The material may also be a thermoplastic elastomer such as those sold under the trade designations SANTOPRENE and ALCRYN by Monsanto and DuPont, respectively. The metal surface may be selected from any of the common structural metals such as iron, steel (including stainless steel and electrogalvanized steel), lead, aluminum, copper, brass, bronze, MONEL metal alloy, nickel, zinc and the like.

For adhesive bonding, the primer composition typically is applied to the metal surface and then dried. The covercoat then is applied to the primer-coated metal surface and the coated metal surface and elastomeric surface are brought together under heat and pressure to complete the bonding procedure. The exact conditions selected will depend upon the particular elastomer being bonded and whether or not it is cured prior to bonding. In some cases, it may be desirable to heat the metal surface prior to application of the primer and/or covercoat composition(s) to assist in drying of the composition(s). The coated metal surface and the elastomeric surface are typically brought together under a pressure of 20 to 175 MPa, preferably from 20 to 50 MPa. If the elastomer is uncured, the resulting elastomer-metal assembly is simultaneously heated to a temperature of 140° C. to 220° C., preferably 160° C. to 200° C. The assembly should remain under the applied pressure and temperature for a period of 1 minute to 60 minutes, depending on the cure rate and thickness of the elastomeric substrate. If the elastomer is already cured, the bonding temperature may range from 90° C. to above 180° C. for 15 to 120 minutes.

The bonding process may be carried out by introducing the elastomer as a semi-molten material to the metal surface as in, for example, an injection-molding process. The process may also be carried out by utilizing compression molding, transfer molding or autoclave curing techniques. After the process is complete, the bond is fully vulcanized and ready for use in a final application.

The covercoat can essentially be any polymeric material-adhering adhesive, such as those described in U.S. Pat. Nos. 3,258; 3,258,389; 4,119,587; 5,200,459; 5,300,555 and 5,496,884. Elastomer-to-metal adhesive covercoats are commercially available from Lord Corporation.

The invention will be described in more detail by way of the following non-limiting examples. The failure mechanism for the tested bond is expressed in terms of percent. A high percent of rubber retained (R) on the metal coupon is desirable since this indicates that the adhesive bond is stronger than the rubber itself. Rubber-cement failure (RC) indicates the percentage of failure at the interface between the rubber and the adhesive. Cement-metal failure (CM) indicates the percentage of failure at the interface between the metal substrate and the adhesive.

For the boiling water test the bonded test assemblies or coupons were prepared according to ASTM-D-429-B. The leading edge of each of the assemblies was stressed by suspending a two kg weight on the overlapping rubber tail and the assembly was then mounted in a fixture so that the rubber tail was at an approximately 90° angle to the plane formed by the bonded interface. The stressed edge interface was exposed to boiling water by immersing the coupon in boiling water for the indicated time period. After this time, the coupons were removed from the boiling water, allowed to cool and tested on either an Instron mechanical tester by pulling the rubber off the metal at a 45° angle stripping fixture with a crosshead speed of 2 inches per minute or by manually peeling the rubber from the metal substrate. The amount of rubber retained on the bonded area is recorded as a percentage as described above.

For the salt spray test the bonded test assemblies prepared according to ASTM-D-429-B were buffed on the edges with a grinding wheel. The rubber is then tied back over the metal with stainless steel wire so as to stress the bonded area. This exposes the bond line to the environment. The assemblies then are strung on stainless steel wire and placed in a salt spray chamber. The environment inside the chamber is 100° F., 100 percent relative humidity and 5 percent dissolved salt in the spray, which is dispersed throughout the chamber. The assemblies remain in this environment for the indicated time period. Upon removal, the rubber is peeled manually from the metal substrate. The amount of rubber retained on the bonded area is recorded as a percentage as described above.

EXAMPLE 1

Preparation of Dispersed Novolak Resin 40 g of 6,7-dihydroxy-2-naphthalenesulfonate, sodium salt (available from Andrew Chemicals), 136 g of a water soluble resole (made from formaldehyde and phenol, F/P ratio of 2.3, 80% solids and commercially available from Schenectady under the trade designation HRJ 11722), 50 g of tert-butyl catechol and 50 g of water were mixed together and steam heated for approximately three and one-half hours until the mixture became very viscous. 220 g of resorcinol and 220 g of water were added followed by 6 g of phosphoric acid in 20 g of water. Steam heating was continued for another 40 minutes. 70 g of formalin then was added while continuing steam heating resulting in a concentrate. The concentrate was filtered and self-dispersed upon the addition of 1730 g of water.

EXAMPLE 2

Preparation of Dispersed Resole Resin 250 g of 6,7-dihydroxy-2-naphthalenesulfonate, sodium salt (available from Andrew Chemicals), 250 g of the HRJ11722 water soluble resole, and 50 g of water were mixed together and steam heated for approximately three hours resulting in a very thick concentrate. 850 g of water was added to the concentrate which then self-dispersed and was filtered.

EXAMPLE 3

Preparation of Dispersed Novolak Resin 80 g of 6,7-dihydroxy-2-naphthalenesulfonate, sodium salt (available from Andrew Chemicals), 272 g of the HRJ11722 water soluble resin, 100 g of tert-butyl catechol and 50 g of water were mixed together and steam heated for approximately three and one-half hours until the mixture became very viscous. 440 g of resorcinol and 440 g of water were added followed by 12 g of phosphoric acid in 25 g of water. Steam heating was continued for another 40 minutes. 130 g of formalin then was added while continuing steam heating resulting in a concentrate. The concentrate was filtered and self-dispersed upon the addition of 3085 g of water.

EXAMPLE 4

Adhesive Primer

The following ingredients were mixed together in indicated wet weight grams to obtain an adhesive primer:

| | |
|---|---|
| Aqueous dispersed novolak | 800 g |
| ZnO | 96 g |
| TiO$_2$ | 40 g |
| Carbon black | 2 g |
| γ-polyoxymethylene ether | 64 g |
| Fumed silica | 34 g |
| Sodium polyacrylate (wetting agent) | 3 g |
| Dichlorobutadiene homopolymer (VERSA TL/DOWFAX stabilized) | 180 g |
| Water | 200 g |

This primer was applied to zinc phosphatized steel coupons and cold rolled steel coupons and dried. A commercially available aqueous covercoat adhesive (CHEMLOK® 8201 available from Lord Corporation) was applied to the dried primer. Natural rubber was bonded to the coated steel coupons via injection molding. The bonded zinc phosphatized coupons had 100%R under the 2 hour boiling water test. The bonded cold-rolled steel coupons had 90%R to 98%R under the boiling water test.

The aqueous dispersed novolak utilized in this Example 4 was made as follows: 80 g 6,7-dihydroxy-2-naphthalenesulfonate, sodium salt (available from Andrew Chemicals), 670 g of a water soluble resole (made from formaldehyde and phenol, F/P ratio of 0.95, 67% solids and commercially available from Schenectady under the trade designation SG3100), 80 g of tert-butylphenol and 200 g of water were mixed together and steam heated for approximately four hours. 440 g of resorcinol and 200 g of water were added followed by 8 g of phosphoric acid. 180 g of formalin then were added and the steam heating was continued for another 1 hour resulting in a concentrate. The concentrate was filtered and self-dispersed upon the addition of 4000 g of water.

EXAMPLE 5

Coating/Primer

The following ingredients were mixed together in indicated wet weight grams to obtain a coating/primer:

| | |
|---|---|
| Carbon black | 7 g |
| ZnO | 60 g |
| Aqueous resole dispersion of Example 2 | 125 g |
| Polyvinyl alcohol-stabilized resole (BKUA 2370) | 200 g |
| Dichlorobutadiene homopolymer (VERSA TL/DOWFAX stabilized) | 150 g |
| Water | 300 g |

The following ingredients were mixed together in indicated wet weight grams to obtain a metal treatment:

| | |
|---|---|
| Aqueous novolak dispersion of Example 1 | 400 g |
| Phosphoric acid | 34 g |
| Water | 3100 g |

The metal treatment was spray applied to one set of warm steel coupons. The treated coupons were dried at 150° F. and then left at ambient room temperature for 1 to 24 hours. The dried treated coupons were then heated for 10 minutes at 160° F. and the coating/primer was spray applied. The coupons then were heated at 150° F. for 15 minutes. With another set of coupons only the coating/primer was spray applied. A commercially available aqueous adhesive covercoat (CHEMLOK® 8282 available from Lord Corporation) then was spray applied to the treated, primed coupons. Natural rubber was injection molded bonded to the coupons at 1 minute prebake and 5 minutes cure at 360° F. The bonded test assemblies were subjected to the 40 hour boiling water test. The set of coupons that were metal treated and primed exhibited a mean bonding performance of 99R, 1CM under and the set of that were only primed exhibited a mean bonding performance of 100 R.

EXAMPLE 6

Autodepositable Coating/Primer

The following ingredients were mixed together in indicated wet weight grams to obtain an autodepositable coating/primer:

| | |
|---|---|
| Carbon black | 21 g |
| ZnO | 180 g |
| Aqueous resole dispersion of Example 2 | 400 g |
| Polyvinyl alcohol-stabilized resole (BKUA 2370) | 600 g |
| Dichlorobutadiene homopolymer (VERSA TL/DOWFAX stabilized) | 450 g |
| Water | 1000 g |

The following ingredients were mixed together in indicated wet weight grams to obtain a metal treatment used as an activator composition:

| | |
|---|---|
| Aqueous novolak dispersion of Example 3 | 600 g |
| Phosphoric acid | 400 g |
| Water | 2700 g |

Phosphatized steel coupons were dipped in a bath of the metal treatment composition (4% solids) for 5 seconds. The metal treatment composition formed a continuous wet film on the steel coupon surface indicating successful autodeposition. The treated coupons then were dried at 150° F. The dried treated coupons were then dipped in a bath of the coating/primer (20% solids) for 15 seconds. The coating/primer composition formed a continuous wet film on the steel coupon surface indicating successful autodeposition. The coated coupons then were dried for 15 minutes at 150° F. A one inch area then was masked off and a commercially available aqueous adhesive covercoat (CHEMLOK® 8282 available from Lord Corporation) was spray applied onto the treated and coated coupons. The coupons then were prebaked for 30 seconds at 360° F. prior to bonding natural rubber for 5 minutes at 360° F. to the adhesive coated coupon. This procedure was repeated, but the prebake was for 1 minute at 340° F. and bonding was for 7 and one-half minutes at 340° F. The resulting test assemblies were subjected to the 4 hour boiling water test and the salt spray test (500, 750 and 1000 hours). The results for all of the assemblies were 100%R bonding performance, no underbond corrosion and very minor blistering in the unbonded portion that had been masked off.

EXAMPLES 7–14

Coating/Primer with Different Flexibilizers

A phenolic novolak resin aqueous dispersion was made by mixing together 160 g of sodium salt of 6,7-dihydroxy-2-naphthalenesulfonate, 544 g of a water soluble resole (made from formaldehyde and phenol, F/P ratio of 2.3, 80% solids and commercially available from Schenectady under the trade designation HRJ11722), 200 g of catechol and 200 g of water and steam heating for approximately two hours until the reaction mixture became very viscous and provided a clear dispersion. 880 g of resorcinol and 500 g of water were added followed by 12 g of phosphoric acid in 10 g of water. Steam heating was continued for another 15 minutes. 640 g of formalin (18.5% aqueous solution) then was added while continuing steam heating resulting in a resin concentrate. The concentrate was filtered and self-dispersed upon the addition of 5900 g of water. This novolak dispersion was used to make an autodepositable metal treatment composition by mixing the following ingredients in wet weight amounts: 180 g of the novolak dispersion (20% solids); 180 g phosphoric acid (10% solids); 475 g water; 76 g 2,4-dinitrobenzene sulfonate (5% solids); and 36 g of HYCAR 1578 latex (50% solids).

A phenolic resole resin aqueous dispersion was made by mixing together 40 g of sodium salt of 6,7-dihydroxy-2-naphthalenesulfonate, 250 g of the HRJ11722 resole resin, and 50 g of water and steam heating for approximately 2 hours until the reaction mixture became very viscous and provided a transparent dispersion. 800 g of water was added to the resulting resin concentrate which then self-dispersed and was filtered. This resole dispersion was used to make autodepositable coating/primer formulations with different flexibilizers by mixing together the following ingredients in wet weight amounts: 2.25 g carbon black; 7.5 g zinc oxide; 9.37 g mica; 45 g of the resole dispersion (20% solids); 67.5 g of aqueous phenolic resole resin dispersion; 540 g phenolic resole aqueous dispersion that incorporates a non-ionic protective colloid, presumably polyvinyl alcohol, (available from Georgia-Pacific under the trade designation GP 4000); 100 g flexibilizer and 225 g water to produce a composition having a solids content of 18%. The flexibilizers were: Example 7—chlorosulfonated polyethylene latex (available from Lord Corporation under the trade designation HYP 605); Example 8—chlorinated natural rubber latex; Example 9—styrene-acrylic polymer latex (available from Goodyear Tire & Rubber under the trade designation PLIO-TEC 7104); Example 10—styrene-acrylic polymer latex (available from Union Carbide under the trade designation UCAR 443); Example 11—urethane latex (available from Bayer under the trade designation BAYHYDROL 123); Example 12—styrene-butadiene rubber emulsion (commercially available from Reichold Chemical Co. under the trade designation TYLAC 97924); Example 13—acrylonitrile-butadiene latex (available from B. F. Goodrich under the tradename HYCAR 1578X 1); and Example 14—dichlorobutadiene homopolymer.

Cold rolled steel panels (known as Q-panels) were immersed in a bath of the metal treatment composition for 10 seconds and then dried for 3 to 5 minutes at 180° F. Warm (approximately 150° F.) treated Q-panels were dipped for 10 seconds in baths of the coating/primer compositions. After removal from the bath the Q-panels were dried for 5 to 10 minutes at 180° F. and then baked for 15 minutes at 320° F.

The resulting autodeposited-coated Q-panels were placed in a salt spray chamber at 95° F., 100 percent relative humidity and 5 percent dissolved salt in the spray, which is dispersed throughout the chamber for 250 and 500 hours, respectively. After removal from the salt spray chamber, the Q-panels were abraded with SCOTCHBRITE abrasive cleaning pads to determine the durability of the coating that had been subjected to the corrosive salt spray testing. The percent of coating remaining intact is indicated in Table 1. The Q-panels then were flexed around a 5/16 inch mandrel and the crown of the flex was abraded by SCOTCHBRITE pads and the percent of intact coating indicated in Table 1.

In another set of tests, cold rolled steel coupons were dipped in the metal treatment and coating/primer baths in the same manner as the Q-panels. A commercially available aqueous adhesive covercoat (CHEMLOK® 8282 available from Lord Corporation) was spray applied onto the treated and coated coupons. Natural rubber then was bonded to the treated and primed coupons via injection molding at 340° F. for 8 minutes. The primary adhesion test results are shown in Table 1.

TABLE 1

| Example | 250 hr SS | 250 hr SS flex | 500 hr SS | 500 hr SS flex | Failure mode | Bond strength |
|---------|-----------|----------------|-----------|----------------|--------------|---------------|
| 7 | 100% | 10% | 95% | 5% | 100R | 48 |
| 8 | 100% | 0% | 95% | 0% | 97R, 3RC | 45 |
| 9 | 100% | 95% | 95% | 90% | 98R, 2RC | 45 |
| 10 | 99% | 100% | 94% | 95% | 100R | 49 |
| 11 | 100% | 100% | 95% | 95% | 100R | 49 |
| 12 | 100% | 10% | 95% | 5% | 100R | 50 |
| 13 | 100% | 100% | 95% | 95% | 100R | 52 |
| 14 | 98% | 50% | 93% | 45% | 99R, 1CM | 48 |

What is claimed is:

1. An aqueous composition comprising the following ingredients:
   (A) an aqueous dispersion of a phenolic resin that includes a reaction product of:
      (i) a phenolic resin precursor; and
      (ii) a modifying agent wherein the modifying agent includes
         (a) at least one functional moiety that enables the modifying agent to react with the phenolic resin precursor; and
         (b) at least one ionic moiety; and
   (B) a flexibilizer.

2. A composition according to claim 1 wherein the modifying agent comprises an aromatic compound.

3. A composition according to claim 1 wherein the ionic moiety of the modifying agent is selected from sulfate, sulfonate, sulfinate, sulfenate or oxysulfonate and the dispersed phenolic resin reaction product has a carbon/sulfur atom ratio of 20:1 to 200:1.

4. A composition according to claim 1 wherein the phenolic resin precursor comprises a resole.

5. A composition according to claim 1 wherein the modifying agent is selected from a sulfonated naphthalene, a sulfonated formyl group-containing compound or a sulfonated diazo compound.

6. A composition according to claim 1 wherein the functional moiety of said modifying agent that enables the modifying agent to react with the phenolic resin precursor is selected from hydroxy, hydroxyalkyl, formyl, or diazo.

7. A composition according to claim 1 wherein the modifying agent comprises a structure represented by formula Ia or Ib:

Formula Ia

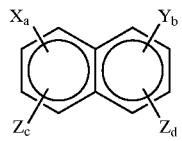

Formula Ib wherein X is the ionic moiety; Y is the reaction-enabling moiety; Z is a chelating substituent; $L^1$ is a divalent linking group; a is 1; b is 1 to 4; m is 0 or 1; and c and d are each independently 0 to 3, provided there are not more than 4 substituents on each aromatic ring.

8. A composition according to claim 1 wherein the ionic moiety is a sulfonate and the reaction-enabling moiety is selected from hydroxy or hydroxyalkyl.

9. A composition according to claim 1 wherein the modifying agent comprises dihydroxy naphthalenesulfonate.

10. A composition according to claim 9 wherein the phenolic resin precursor comprises a resole.

11. A composition according to claim 1 wherein the flexibilizer is selected from (poly)butadiene, neoprene, styrene-butadiene rubber, nitrile rubber, halogenated polyolefin, acrylic polymer, urethane polymer, ethylene-propylene copolymer rubber, ethylene-propylene-diene terpolymer rubber, styrene-acrylic copolymer, polyamide and poly(vinyl acetate).

12. A composition according to claim 11 wherein the flexibilizer is selected from halogenated polyolefin, nitrile rubber and styrene-acrylic copolymer.

13. A composition according to claim 12 wherein the flexibilizer comprises a butadiene polymer latex.

14. A composition according to claim 13 wherein the butadiene polymer latex is prepared by emulsion polymerizing dichlorobutadiene in the presence of a stablizer selected from styrene sulfonic acid, styrene sulfonate, poly(styrene sulfonic acid) or poly(styrene sulfonate).

15. A composition according to claim 10 wherein the butadiene polymer latex is prepared by emulsion polymerizing dichlorobutadiene in the presence of a stablizer selected from styrene sulfonic acid, styrene sulfonate, poly(styrene sulfonic acid) or poly(styrene sulfonate).

16. A composition according to claim 1 wherein the composition is autodepositable on a metal substrate.

17. A composition according to claim 1 wherein the dispersed phenolic resin comprises a resole.

18. A composition according to claim 1 wherein the dispersed phenolic resin comprises a mixture of oligomers having structures represented by

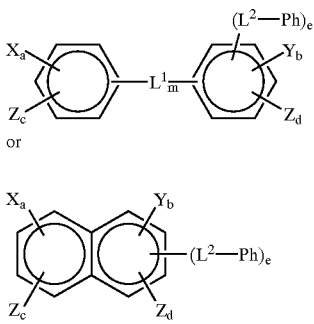

wherein X is the ionic moiety; Y is the reaction-enabling moiety; Z is a chelating substituent; $L^1$ is a divalent linking group; a is 1; b is 1 to 4; m is 0 or 1; and c and d are each independently 0 to 3; e is 1 to 6; $L^2$ is a divalent linking group; and Ph is the phenolic resin precursor backbone structure, provided the —($L^2$—Ph) group(s) is(are) ortho or para to a Y group.

19. A composition according to claim 1 further comprising a second phenolic resin dispersion ingredient.

20. A composition according to claim 19 wherein the second phenolic resin dispersion comprises a polyvinyl alcohol-stabilized aqueous resole dispersion.

21. A composition according to claim 15 wherein the second phenolic resin dispersion comprises a polyvinyl alcohol-stabilized aqueous resole dispersion.

22. A composition according to claim 1 further comprising a metal oxide ingredient and a mica ingredient.

23. A composition according to claim 21 further comprising a metal oxide ingredient and a mica ingredient.

24. A composition according to claim 1 wherein the dispersed phenolic resin is made from an additional reactant (iii) comprising a multi-hydroxy phenolic compound.

25. A composition according to claim 24 wherein the multi-hydroxy compound is selected from resorcinol, pyrocatechol, hydroquinone, pyrogallol, 1,3,5-benzenetriol or tert-butyl catechol.

26. An aqueous composition formed by combining:
(A) an aqueous dispersion of a phenolic resin that includes a reaction product of:
(i) a phenolic resin precursor; and
(ii) a modifying agent wherein the modifying agent includes
(a) at least one functional moiety that enables the modifying agent to react with the phenolic resin precursor; and
(b) at least one ionic moiety; and
(B) a flexibilizer.

27. A method for providing a protective coating on a metallic substrate comprising applying an aqueous coating composition onto the metallic substrate wherein the composition comprises the following ingredients:
(A) an aqueous dispersion of a phenolic resin that includes a reaction product of:
(i) a phenolic resin precursor; and
(ii) a modifying agent wherein the modifying agent includes
(a) at least one functional moiety that enables the modifying agent to react with the phenolic resin precursor; and
(b) at least one ionic moiety; and
(B) a flexibilizer.

28. A method according to claim 27 wherein the phenolic resin precursor comprises a resole.

29. A method according to claim 27 wherein the modifying agent comprises dihydroxy naphthalenesulfonate.

30. A method according to claim 27 wherein the flexibilizer is selected from (poly)butadiene, neoprene, styrene-butadiene rubber, nitrile rubber, halogenated polyolefin, acrylic polymer, urethane polymer, ethylene-propylene copolymer rubber, ethylene-propylene-diene terpolymer rubber, styrene-acryiic copolymer, polyamide and poly (vinyl acetate).

31. A method according to claim 30 wherein the flexibilizer comprises a butadiene polymer latex.

32. A method according to claim 31 wherein the butadiene polymer latex is prepared by emulsion polymerizing dichlorobutadiene in the presence of a stabilizer selected from styrene sulfonic acid, styrene sulfonate, poly(styrene sulfonic acid) or poly(styrene sulfonate).

33. A method for providing a protective coating on a metallic substrate comprising applying an aqueous coating composition formed by combining:
(A) an aqueous dispersion of a phenolic resin that includes a reaction product of:
(i) a phenolic resin precursor; and
(ii) a modifying agent wherein the modifying agent includes
(a) at least one functional moiety that enables the modifying agent to react with the phenolic resin precursor, and
(b) at least one ionic moiety; and
(B) a flexibilizer.

34. A method according to claim 33 wherein the dispersed phenolic resin comprises a resole.

35. A method according to claim 33 wherein the application of the aqueous composition is effected by dipping the metallic substrate into a bath of the aqueous composition so that the composition autodeposits the protective coating on the substrate.

36. A method according to claim 33 further comprising applying an aqueous metal treatment composition to the metallic substrate prior to application of the coating composition wherein the aqueous metal treatment composition comprises the following ingredients:
(A) an aqueous dispersion of a phenolic novolak resin that includes a reaction product of:
(i) a phenolic resin precursor;
(ii) a modifying agent that includes
(a) at least one functional moiety that enables the modifying agent to react with the phenolic resin precursor; and
(b) at least one ionic moiety; and
(iii) at least one multi-hydroxy phenolic compound; and
(B) an acid.

37. A method according to claim 36 wherein the phenolic resin precursor comprises a resole, the modifying agent comprises dihydroxy naphthalenesulfonate, the multi-hydroxy phenolic compound is selected from resorcinol or pyrocatechol, and the acid comprises phosphoric acid.

38. A method according to claim 37 wherein the metal treatment composition further comprises an organic nitro compound ingredient.

39. A method for bonding an elastomeric substrate surface to a metallic substrate surface comprising autodepositing an aqueous coating or primer composition onto the metallic substrate, wherein the aqueous coating composition comprises the following ingredients:

(A) an aqueous dispersion of a phenolic resin that includes a reaction product of:
  (i) a phenolic resin precursor; and
  (ii) a modifying agent wherein the modifying agent includes
    (a) at least one functional moiety that enables the modifying agent to react with the phenolic resin precursor; and
    (b) at least one ionic mroiety; and
(B) a flexidilizer, and then applying an adhesive covercoat to effect bonding of the metallic substrate to the elastomeric substrate.

40. A method according to claim 39 further comprising applying an aqueous metal treatment composition to the metallic substrate prior to application of the coating composition wherein the aqueous metal treatment composition comprises the following ingredients:
an aqueous dispersion of a phenolic novolak resin that includes a reaction product of:
  a phenolic resin precursor;
  a modifying agent that includes
    at least one functional moiety that enables the modifying agent to react with the phenolic resin precursor; and
    at least ionic moiety; and
  at least one multi-hydroxy phenolic compound
(B) an acid.

41. A method according to claim 40 wherein the coating or primer composition comprises the following ingredients:
(A) an aqueous dispersion of a phenolic resin that includes a reaction product of:
  (i) a phenolic resin precursor; and
  (ii) a modifying agent that includes
    (a) at least one functional moiety that enables the modifying agent to react with the phenolic resin precursor; and
    (b) at least one ionic moiety; and
(B) a flexibilizer.

42. A method according to claim 41 further comprising applying an adhesive covercoat to the primer-coated metallic substrate.

43. A method according to claim 39 wherein the phenolic resin precursor comprises a resole.

44. A method according to claim 39 wherein the modifying agent comprises dihydroxy naphthalenesulfonate.

45. A method according to claim 39 wherein the flexibilizer is selected from (poly)butadiene, neoprene, styrene-butadiene rubber, nitrile rubber, halogenated polyolefin, acrylic polymer, urethane polymer, ethylene-propylene copolymer rubber, ethylene-propylene-diene terpolymer rubber, styrene-acrylic copolymer, polyamide and poly(vinyl acetate).

46. A method according to claim 45 wherein the flexibilizer comprises a butadiene polymer latex.

47. A method according to claim 46 wherein the butadiene polymer latex is prepared by emulsion polymerizing dichlorobutadiene in the presence of a stabilizer selected from styrene sulfonic acid, styrene sulfonate, poly(styrene sulfonic acid) or poly(styrene sulfonate).

48. A method according to claim 39 wherein the dispersed phenolic resin comprises a resole.

49. A method according to claim 39 wherein the application of the aqueous composition is effected by dipping the metallic substrate into a bath of the aqueous composition so that the composition autodeposits the protective coating on the substrate.

50. A method according to claim 41 wherein application of the metal treatment composition and the primer composition are both effected by dipping the metallic substrate first into a bath of the metal treatment composition and then into a bath of the primer composition.

51. A method according to claim 39 wherein the aqueous coating composition further comprises a metal oxide ingredient and a mica ingredient.

52. A method according to claim 41 wherein the phenolic resin precursor for both the metal treatment composition and the primer composition comprises a resole, the modifying agent for both the metal treatment composition and the primer composition comprises a dihydroxy naphthalenesulfonate, the multi-hydroxy phenolic compound is selected from resorcinol and pyrocatechol, and the acid comprises phosphoric acid.

53. A method according to claim 41 wherein the metal treatment composition further comprises an organic nitro compound ingredient.

54. The aqueous composition of claim 26 wherein the phenolic resin precursor is a resole and said modifying agent is a hydroxy naphthalenesulfonate.

55. A method for providing a protective coating or primer on a metallic substrate surface comprising applying the composition of claim 54 to the metallic substrate.

56. A method according to claim 39 wherein the coating or primer composition includes a sulfur-modified phenolic resin.

57. A method according to claim 56 wherein the coating or primer composition includes a sulfonate-modified phenolic resin.

* * * * *